United States Patent Office 3,062,820
Patented Nov. 6, 1962

3,062,820
PYRIDAZINO[1,2-a]-PYRIDAZINE-1,4-DIONES AND PYRIDAZINO[1,2-b]-PHTHALAZINE-6,11-DIONES
Thomas J. Kealy, Wilmington, Del., assignor to E. I. du Pont de Nemours and Company, Wilmington, Del., a corporation of Delaware
No Drawing. Filed May 2, 1960, Ser. No. 25,833
8 Claims. (Cl. 260—250)

This invention relates to new nitrogen heterocyclics. More particularly, it relates to new pyridazine derivatives and methods of preparing them.

The new products made available by this invention are the 1,2-maleyl-1,2,3,6-tetrahydropyridazines and the 1,2-phthaloyl-1,2,3,6-tetrahydropyridazines represented generically by the formula

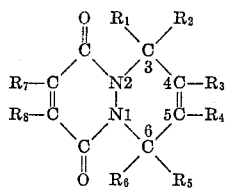

where the annular atoms of the pyridazine ring are numbered for easier reference. In this formula, the symbols $R_7$ and $R_8$ can both be hydrogen, in which case the compound is a 1,2-maleyl-1,2,3,6-tetrahydropyridazine; or they can together form the divalent radical

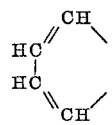

in which case the compound is a 1,2-phthaloyl-1,2,3,6-tetrahydropyridazine. The symbols $R_1$ through $R_6$ represent hydrogen or alkyl radicals, and $R_1$ and $R_6$ together can form an alkylene bridge joining the carbon atoms in the 3- and 6-positions in the pyridazine ring. Thus, the compounds of this invention correspond to one of the formulas (I)

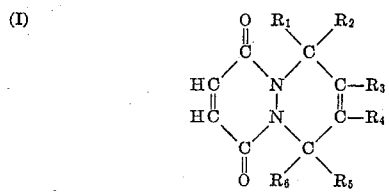

or (II)

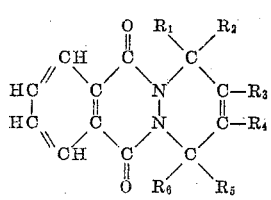

with the proviso that $R_1$ and $R_6$ can form an alkylene bridge, in which case the pyridazine ring in the above formulas has the structure

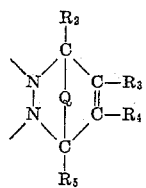

where Q is a divalent alkylene radical.

In accordance with the rules of nomenclature followed by Chemical Abstracts, the compounds of Formula I may be named 6,9-dihydropyridazino[1,2-a]pyridazine-1,4-diones, and those of Formula II 1,4-dihydropyridazino[1,2-b]phthalazine - 6,11 - diones. However, the somewhat shorter names 1,2-maleyl- and 1,2-phthaloyl-1,2,3,6-tetrahydropyridazines will be generally used throughout this discussion for the sake of brevity.

The compounds of this invention are prepared by bringing in contact an aliphatic or cycloaliphatic 1,3-diene hydrocarbon, i.e., an aliphatic or cycloaliphatic hydrocarbon containing a conjugated system of double bonds, with pyridazine-3,6-dione or phthalazine-1,4-dione, in a liquid organic solvent and at temperatures, below about 0° C., where the heterocyclic reactant is stable.

The reaction that takes place is a Diels-Alder type condensation whereby the dienophile, that is, pyridazine-3,6-dione or phthalazine-1,4-dione, adds through its nitrogen atoms to the conjugated system of the diene at the 1- and 4-positions of the latter. It is represented by the following Equations 1 (with pyridazine-3,6-dione) and 2 (with phthalazine-1,4-dione), in which equations the symbols $R_1$–$R_6$ have the previously stated significance and $R_1$ and $R_6$ together can be a divalent alkylene radical uniting the carbon atoms to which they are attached:

(1)

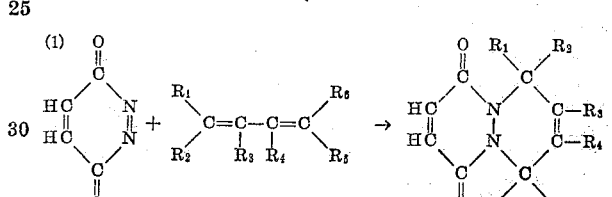

(2)

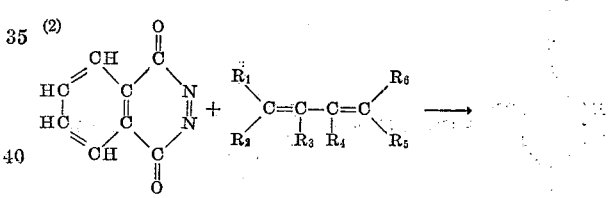

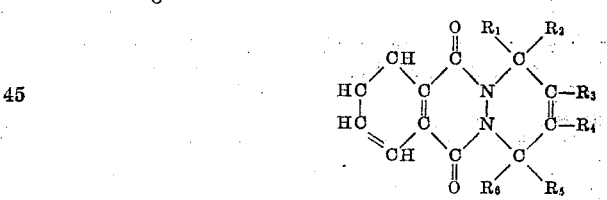

One of the starting materials used in this process is an aliphatic or cycloaliphatic 1,3-diene hydrocarbon. Compounds of this type are well-known. They are either available commercially or obtainable by well established methods. The most accessible, and therefore preferred diene hydrocarbons for use in the process of this invention are those having from 4 to 16 carbon atoms, i.e., those in which the groups $R_1$ to $R_6$, when they are not hydrogen, are alkyl radicals containing together a total of 1 to 12 carbon atoms, with the proviso that $R_1$ and $R_6$ together can be an alkylene radical, preferably containing from 1 to 5 carbon atoms.

The other starting material can be termed a 2,3-diazaquinone and is represented by the formula (III)

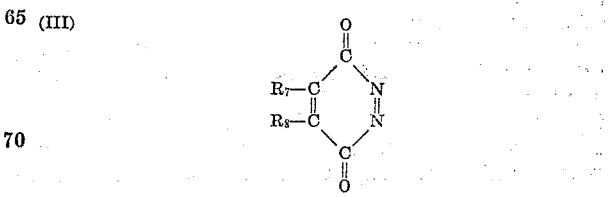

wherein $R_7$ and $R_8$ are hydrogen and when taken together $R_7$ and $R_8$ can form the divalent radical

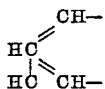

Thus, this starting material is either pyridazine-3,6-dione,

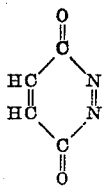

or phthalazine-1,4-dione,

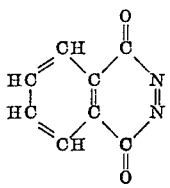

These compounds, which may also be called, respectively, 2,3-diaza-1,4-benzoquinone and 2,3-diaza-1,4-naphthoquinone, are also new and they have not been previously described. They are prepared by oxidizing a metal salt, such as a monoalkali metal salt, of maleic hydrazide or phthalic hydrazide with all alkyl hypochlorite in an inert organic solvent at a temperature, below about 0° C. and preferably below about —40° C., at which the reaction product is stable in solution. The reaction which takes place may be represented by the following equation, using maleic hydrazide monosodium salt as the illustrative reactant:

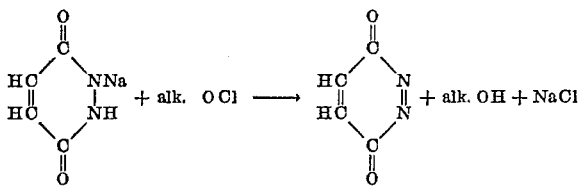

where alk. stands for an alkyl radical (it is immaterial from the standpoint of this equation whether the maleic hydrazide sodium salt is present as the N-salt, as shown, or as its tautomer, the O-salt).

In this method, which is illustrated in greater detail in some of the examples which follow, an alkali metal salt, e.g., the sodium or the potassium salt, or another soluble salt, of the hydrazide can be used. These salts can be prepared by known methods. There can be used any alkyl hypochlorite, preferably one in which the alkyl radical has from 1 to 6 carbon atoms, e.g., methyl, ethyl, n-hexyl hypochlorite. The preferred oxidizing agent, because it can be handled more safely, is tert.-butyl hypochlorite.

The two reactants are mixed, preferably in approximately equimolar proportions, in an inert organic liquid which is a solvent for the alkyl hypochlorite and for the reaction product and which, of course, is substantially non-reactive or inert toward the reactants and reaction product, though normally such inertness poses no problem in this process. As a solvent, there can be used any organic compound, free of aliphatic carbon-to-carbon unsaturation, which remains liquid at the low temperatures used and which dissolves both reactants at least to some extent, e.g., 0.1% by weight, at such temperatures. While it is true that such inert organic solvents are not available in great variety, in general they are readily available. Suitable solvents include dialkyl ketones and dialkyl ethers wherein each alkyl group contains up to 4 carbon atoms, for example, acetone, methyl ethyl ketone, dimethyl ether, etc., and also cyclic ethers such as tetrahydrofuran or the like. Mixtures of these solvents can be employed.

Pyridazine-1,3-dione and phthalazine-1,4-dione are extremely reactive materials which lose nitrogen readily even at low temperatures. For this reason, their preparation is conducted at temperatures where they are stable in solution. It is recommended that reaction temperatures not exceed about 0° C., and the oxidation is preferably carried out below about —40° C., especially when pyridazine-3,6-dione is being prepared. A convenient temperature range is that between about —80° and —50° C., although temperatures below —80° C. can be used with low freezing solvents. Temperatures down to the freezing point of the solvent medium can be used.

Phthalazine-1,4-dione can be isolated as a solid and it is stable at ordinary temperature for limited periods. Pyridazine-3,6-dione can also be precipitated as a solid from its solutions, but it is stable only at low temperatures. Both products are best stored and handled in solution at temperatures below about —40° C.

The synthesis of the 1,2-maleyl- or 1,2-phthaloyl-1,2,3,6-tetrahydropyridazines is conducted simply by bringing the appropriate 1,3-diene (described above) into contact with the appropriate 2,3-diazaquinone (described above) in an inert liquid organic solvent at temperatures below about 0° C. and preferably below —40° C., especially when using pyridazine-3,6-dione. A convenient temperature range is that between —80° and —50° C., although lower temperatures, e.g., as low as —100° C., can be used. Temperatures down to the freezing point of the solvent can be used.

The reaction is essentially instantaneous even at the low temperatures involved. Its progress can be readily followed by observing the disappearance of the green color characteristic of either of the heterocyclic starting materials.

The reactants are mixed, preferably in about equimolar proportions, in an inert organic compound which is liquid at reaction temperature, is at least a partial solvent for the reactants, and is preferably one in which they are soluble at least to the extent of 0.1% by weight at reaction temperature. The solvent should, of course, be substantially inert or non-reactive towards the reactants. Inertness towards pyridazine-3,6-dione or phthalazine-1,4-dione is readily determined by the absence of change in the already mentioned green color of these products. Inertness towards the diene reactant is normally no problem, especially at the low temperatures involved. Suitable inert liquid organic solvents include those already mentioned above in connection with the preparation of the starting materials.

In a preferred mode of practicing the process of this invention, the pyridazine-3,6-dione or phthalazine-1,4-dione is not isolated from the solvent in which it was formed, but the reaction mixture (preferably after removal of the alkali metal chloride and other insoluble materials by filtration) is instead treated directly with the 1,3-diene reactant.

The reactant proportions are not critical. In order to insure maximum utilization of the more expensive heterocyclic reactant, it is generally preferred to use the 1,3-diene reactant in at least equimolar amount with respect thereto, but this is not essential.

As already mentioned, the reaction is very rapid. The reaction product, i.e., the 1,2-maleyl- or 1,2-phthaloyl-1,2,3,6-tetrahydropyridazine, often precipitates out of the reaction medium and can be separated by filtration. If this does not take place, the reaction product can be isolated by concentrating the solution or completely removing the solvent, or by adding a non-solvent to the reaction mixture. The reaction products are solids which, if necessary, can be purified by recrystallization from appropriate solvents.

The products of this invention (i.e., the compounds of

Formulas I and II above) are useful as plant growth regulants, and particularly as control agents for noxious weeds. The compounds of Formula III are useful as intermediates in the preparation of these products.

The invention is illustrated in greater detail in the following examples.

Example I

To a stirred solution of 5.4 g. (0.05 mole) of tert.-butyl hypochlorite in 100 ml. of acetone at −80° C. was added 6.7 g. (0.05 mole) of the monosodium salt of maleic hydrazide. The temperature of the reaction mixture was then maintained at −55 to −65° C. for 3 hours, during which time the mixture developed a green color and the quantity of insoluble material decreased. The reaction mixture was then filtered through a cold sintered glass Buchner funnel under an atmosphere of nitrogen to obtain 3.3 g. of sodium chloride and unreacted material and a green filtrate containing the pyridazine-3,6-dione in solution. The product was precipitated from its solution as a light-green solid by addition of 200 ml. of cold chloroform to the filtrate at −80° C. Attempts to isolate it from its solution resulted, however, in sudden decomposition of the solid as it warmed up to room temperature.

In this process, the potassium salt of maleic hydrazide can be used instead of the sodium salt. In fact, the potassium salt is preferred since it is more soluble in acetone and gives better conversions to pyridazine-3,6-dione at −80° C., which is a convenient operating temperature (that of solid carbon dioxide).

Pyridazine-3,6-dione is stable in solution at temperatures up to about −40° C., and such solutions were used in the condensations with dienes described in the examples which follow. When a solution of pyridazine-3,6-dione, obtained as described above, was allowed to warm up to room temperature, it was converted to an orange solution containing some undissolved white solid. The solid was removed by filtration and the filtrate was reduced in volume on a steam bath and cooled to obtain a yellow solid. Recrystallization of this solid from acetone afforded bright yellow needles, M.P. 247° C. (dec. block). In a capillary tube, the solid appeared to decompose slowly above 160° C. Elemental analysis indicated that this product was 1,4,6,9-tetraketopyridazino[1,2-a]pyridazine,

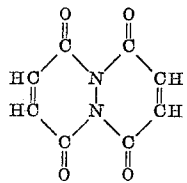

formed by condensation of two molecules of pyridazine-3,6-dione with loss of nitrogen.

*Analysis.*—Calc'd for $C_8H_4N_2O_4$: C, 50.01; H, 2.10; N, 14.58. Found: C, 50.18; H, 2.32; N, 14.16 (Dumas).

The structure of this compound was confirmed by treatment with boiling water, which hydrolyzes it rapidly to maleic hydrazide and maleic acid.

Example II

To a stirred solution of 5.4 g. (0.05 mole) of tert.-butyl hypochlorite in 80 ml. of acetone at −80° C. was added 9.2 g. (0.05 mole) of the monosodium salt of phthalic hydrazide. The solution was maintained near −80° C. for 3.5 hours, resulting in the formation of a deep-green color as the quantity of undissolved solid lessened. The reaction mixture was filtered free of solid, and to the green filtrate at −80° C. was added 150 ml. of cold chloroform, causing precipitation of a green solid. The suspension was filtered cold and the product was air-dried to obtain 1.5 g. of a product which was shown by elemental analysis to be phthalazine-1,4-dione.

*Analysis.*—Calc'd for $C_8H_4N_2O_2$: C, 60.00; H, 2.52. Found: C, 60.28; H, 2.74.

Phthalazine-1,4-dione is stable at room temperature, at least for short periods. On longer standing, it slowly loses its green color with the formation of a white solid and a change in crystallinity. However, in some cases, the product decomposed exothermically on standing in air with a puff of white smoke, but with no flame or explosion. In a melting point capillary tube, phthalazine-1,4-dione loses its green color at about 80° C. with no other noticeable change. It then decomposes with gas evolution at about 140° C. For reactions with dienes, the solution in which phthalazine-1,4-dione was prepared is preferably used directly. If desired, however, the solid can be isolated and redissolved in a solvent for the diene.

The above-described preparative procedure can be carried out at higher temperatures, e.g. up to about 0° C., although preferably not exceeding −40° C. The acetone can be replaced by another solvent, such as, for example, dimethyl ether which, because of its low boiling point, is convenient to use when it is desired to isolate the phthalazine-1,4-dione. In such a case the dimethyl ether can be removed very easily at −80° C. under vacuum to leave a mixture of the phthalazine-1,4-dione and tert.-butyl alcohol, from which the product can be precipitated by addition of a non-solvent such as chloroform, trichloroethylene or methylene chloride.

Example III

To a stirred solution of 3.8 g. (0.035 mole) of tert.-butyl hypochlorite in 50 ml. of acetone at −80° C. was added 4.7 g. (0.035 mole) of the monosodium salt of maleic hydrazide. The reaction mixture was maintained at −60 to −70° C for 4 hours and then filtered cold to remove 2.1 g. of insoluble solid. To the green filtrate containing the pyridazine-3,6-dione thus formed was added at −80° C. 2.8 g. (0.35 mole) of 2,3-dimethyl-1,3-butadiene dissolved in cold acetone, causing the immediate discharge of the green color and the precipitation of a white solid (2.8 g.), M.P. 148.5–155° C. (dec.). Recrystallization of the product from acetone afforded large yellow needles, M.P. 153–159° C. (capillary tube) and 161° C. (block). This product was 1,2-maleyl-4,5-dimethyl-1,2,3,6-tetrahydropyridazine, which may also be named 7,8-dimethyl-6,9-dihydropyridazino[1,2-a]pyridazine-1,4-dione,

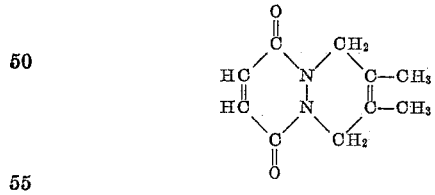

*Analysis.*—Calc'd for $C_{10}H_{12}N_2O_2$: C, 62.48; H, 6.29; N, 14.58. Found: C, 62.02; H, 6.26; N, 14.43 (Dumas).

The structure of the product was confirmed by its infrared and nuclear magnetic resonance spectra.

Example IV

Pyridazine-3,6-dione was prepared as in Example III from 0.1 mole of tert.-butyl hypochlorite and 0.1 mole of maleic hydrazide monosodium salt in acetone. After removing the insoluble material by filtration, gaseous 1,3-butadiene was passed into the green filtrate at −80° C., causing the discharge of the green color and the formation of a lightly colored purple-pink precipitate. The suspension was filtered cold to obtain 9.5 g. of pale yellow solid, M.P. 154–158° C. Upon recrystallization from benzene or petroleum naphtha (B.P. 100–140° C.), the product showed constant melting point of 157–159° C. Its elemental composition and infrared and n-m-r spectra showed that it was 1,2-maleyl-1,2,3,6-tetrahydropyridazine, also named 6,9-dihydropyridazino[1,2-a]pyridazine-1,4-dione,

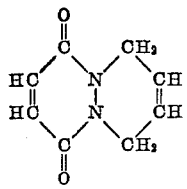

*Analysis.*—Calc'd for $C_8H_8N_2O_2$: C, 58.53; H, 4.91; N, 17.07. Found: C, 58.45; H, 5.38; N, 16.84 (Dumas).

This structure was further confirmed by catalytic hydrogenation over platinum oxide, which yielded 1,2-succinylhexahydropyridazine, M.P. 174–177° C. This product was found, by comparison of melting points and infrared spectra, to be identical with that obtained by reaction of succinhydrazide with 1,4-dibromobutane.

*Example V*

Pyridazine-3,6-dione was prepared as in Example III from 0.05 mole each of tert.-butyl hypochlorite and the sodium salt of maleic hydrazide in acetone. The reaction mixture was filtered at −80° C. and to the cold filtrate was added a solution of 3.3 g. (0.05 mole) of cyclopentadiene in 20 ml. of acetone pre-cooled to −80° C. The green color was discharged instantaneously to give a yellow solution which, on standing 2 hours at −80° C., deposited 4.0 g. of pale yellow solid, M.P. 157–160° C. This product was very soluble in cold chloroform. It was recrystallized from a chloroform-petroleum naphtha mixture to a constant melting point of 178–181° C. Elemental and infrared analyses showed that this product was 1,2-maleyl-3,6-methano-1,2,3,6-tetrahydropyridazine, which may also be named 6,9-methano-6,9-dihydropyridazino[1,2-a]pyridazine-1,4-dione,

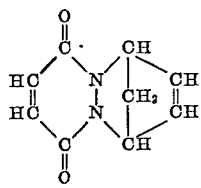

*Analysis.*—Calc'd for $C_9H_8N_2O_2$: C, 61.36; H, 4.58; N, 15.90. Found: C, 61.46; H, 5.01; N, 15.83.

This product is prepared in better yields when the first step of the reaction is carried out by oxidation of the potassium salt of maleic hydrazide with tert.-butyl hypochlorite in acetone at −80° C. for 1.5 hours and when the cyclopentadiene adduct is recrystallized from a cholorform-acetone mixture.

*Example VI*

Pyridazine-3,6-dione was prepared by the reaction of 7.5 g. (approximately 0.042 mole; 85% pure) of the potassium salt of maleic hydrazide with 5.4 g. (0.05 mole) of tert.-butyl hypochlorite in 125 ml. of acetone at −80° C. for 2.5 hours. The reaction mixture was filtered, and to the filtrate at −80° C. was added a cold solution of 4.5 g. of 1,3-cyclohexadiene (83% purity) in 20 ml. of acetone. Some solid separated immediately. After the reaction mixture had been allowed to stand for about 16 hours at a temperature well below 0° C., it was filtered to obtain 4.84 g. of pale yellow crystals, M.P. 198–205° C. This product was recrystallized from benzene to a constant melting point of 212–214.5° C. Elemental and infrared analyses showed that it was 1,2-maleyl-3,6-ethano - 1,2,3,6 - tetrahydropyridazine, also named 6,9-ethano - 6,9 - dihydropyridazino[1,2-a]pyridazine-1,4-dione,

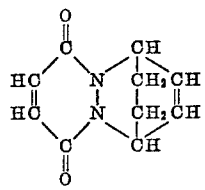

*Analysis.*—Calc'd for $C_{10}H_{10}N_2O_2$: C, 63.15; H, 5.30; N, 14.73. Found: C, 63.59; H, 5.36; N, 14.87.

*Example VII*

Phthalazine-1,4-dione was prepared as described in Example II from the reaction of 9.2 g. (0.05 mole) of phthalic hydrazide monosodium salt with 6 g. (0.0555 mole) of tert.-butyl hypochlorite in 150 ml. of acetone. To approximately one-half of the filtrate from this reaction was added a solution of 2.1 g. (0.025 mole) of 2,3-dimethyl-1,3-butadiene in acetone at −80° C. The green color of the phthalazine-1,4-dione solution was immediately discharged and a tan solid separated, 2.9 g. On standing overnight under a watch glass, the tan solid developed a yellow color. Recrystallization of this solid from acetone afforded 2.0 g. of a mixture of almost colorless prisms (A), M.P. 198° C. (block) and long yellow needles (B) having the same melting point. Concentration of the mother liquors afforded 0.57 g. of yellow prisms (C), M.P. 201° C. (block). Recrystallization of (A) from petroleum naphtha (B.P. 100–140° C.) afforded long pale yellow needles, M.P. 198° C. (block). The X-ray patterns of these needles and the yellow prisms (C) were different. Thus, it appears that this compound can exist in dimorphic forms. Recrystallization of (B) from acetone gave yellow prisms containing a relatively small amount of yellow needles, M.P. 200° C. (block).

Elemental and infrared analyses showed that this product was 1,2-phthaloyl-4,5-dimethyl-1,2,3,6-tetrahydropyridazine, which may also be named 2,3-dimethyl-1,4-dihydropyridazino[1,2-b]phthalazine-6,11-dione,

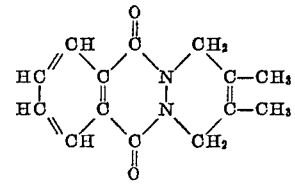

*Analysis.*—Calc'd for $C_{14}H_{14}N_2O_2$: C, 69.40; H, 5.83; N, 11.56. Found: C, 69.49; H, 5.82; N, 11.48 (Dumas).

The same product was obtained by adding 1 g. of isolated, solid phthalazine-1,4-dione to a solution of excess 2,3-dimethyl-1,3-butadiene in acetone at −80° C. This gave 1.2 g. of tan solid which, on recrystallization from acetone, was obtained as bright yellow platelets, M.P. 189–195° C. (capillary).

*Example VIII*

Treatment of an acetone-chloroform solution of phthalazine-1,4-dione, from which some precipitated material had been filtered off, with 1,3-butadiene at −80° C. resulted in discharge of the green color, but the adduct did not precipitate. The solution was concentrated to a small volume to obtain the adduct as white needles. The adduct was very soluble in chloroform and was recrystallized from chloroform-acetone to afford white needles, M.P. 263–268° C. with decomposition. This product was shown by elemental, infrared and n-m-r analyses to be 1,2-phthaloyl-1,2,3,6-tetrahydropyridazine, also named 1,4-dihydropyridazino[1,2-b]phthalazine-6,11-dione,

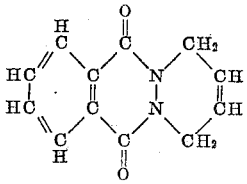

*Analysis.*—Calc'd for $C_{12}H_{10}N_2O_2$: C, 67.28; H, 4.71; N, 13.08. Found: C, 67.29; H, 4.96; N, 13.29 (Dumas).

Other 1,2-maleyl-1,2,3,6-tetrahydropyridazines and 1,2-phthaloyl-1,2,3,6-tetrahydropyridazines which can be obtained by following the general procedure described in the above examples, especially Example Nos. III and VIII, include the following specific compounds, among others:

Example IX 1,2-maleyl-4-methyl-1,2,3,6-tetrahydropyridazine, from pyridazine-3,6-dione and isoprene.

Example X 1,2-phthaloyl-4-methyl - 1,2,3,6 - tetrahydropyridazine, from phthalazine-1,4-dione and isoprene.

Example XI 1,2 - phthaloyl-4-di-methyl-1,2,3,6-tetrahydropyridazine, from phthalazine-1,4-dione and 2,4-hexadiene.

Example XII 1,2-maleyl-3,3-diethyl - 1,2,3,6 - tetrahydropyridazine, from pyridazine-3,6-dione and 4-ethyl-1,3-hexadiene.

Example XIII 1,2 - phthaloyl-4-(n-butyl)-1,2,3,6-tetrahydropyridazine, from phthalazine-1,4-dione and 2-(n-butyl)-1,3-butadiene.

Example XIV 1,2 - maleyl - 3 - isopropyl-6-methyl-6-ethyl-1,2,3,6-tetrahydropyridazine, from pyridazine-3,6-dione and 2,6-dimethyl-3,5-octadiene.

Example XV 1,2-maleyl - 4 - (n-heptyl)-1,2,3,6-tetrahydropyridazine, from pyridazine-3,6-dione and 2-(n-heptyl)-1,3-butadiene.

Example XVI 1,2-maleyl - 4 - (n-decyl)-1,2,3,6-tetrahydropyridazine, from pyridazine-3,6-dione and 2-(n-decyl)-1,3-butadiene.

Example XVII 1,2-phthaloyl - 3,3,6,6 - tetramethyl-1,2,3,6-tetrahydropyridazine, from phthalazine-1,4-dione and 1,1,4,4-tetramethyl-1,3-butadiene.

Example XVIII 1,2-maleyl-4-methyl - 3,6 - [(isopropyl)ethano]-1,2,3,6-tetrahydropyridazine, from pyridazine-3,6-dione and α-phellandrene.

Example XIX 1,2 - phthaloyl-3,6-ethano-1,2,3,6-tetrahydropyridazine, from phthalazine-1,4-dione and 1,3-cyclohexadiene.

Example XX

In demonstration of the plant growth regulant activity possessed by the products of this invention, the following tests are described:

The foliage of three-week old xanthium, a typical noxious weed, was sprayed with 5 ml. of a composition containing 1000 parts of the compound being tested per 1,000,000 parts of solvent, which amounts to the low dosage of approximately 1 lb. of active ingredient per acre. The sprayed plants were observed after two weeks and the following comparisons were made between the treated and untreated (control) plants: plant height; fresh weight; and dry weight (after being heated to 80° C. for about 16 hours). The following table shows that all three compounds tested have a marked growth retarding effect on the test weed. The figures shown in each column are comparisons, expressed in percent, with the untreated (control) plants the value for the latter being taken as 100 in each case.

The compounds respectively tested were:

A. The 1,4,6,9 - tetraketopyridazino[1,2-a]-pyridazine obtained from pyridazine-3,6-dione on spontaneous evolution of nitrogen (see Example I).

B. 1,2 - maleyl-3,6-ethano - 1,2,3,6-tetrahydropyridazine (see Example VI).

C. 1,2 - phthaloyl-1,2,3,6-tetrahydropyridazine (see Example VIII).

D. 1,2-maleyl-4,5-dimethyl-1,2,3,6-tetrahydropyridazine (see Example III).

TABLE 1

| Compound | Plant Height | Fresh Weight | Dry Weight |
|---|---|---|---|
| A | 40 | 50 | 60 |
| B | 80 | 70 | 70 |
| C | 70 | 50 | 60 |

By visual observation, the plant leaves treated with A showed hormone injury and chlorosis.

Additionally, when compounds C and D were tested in the same manner on three-week old millet (a typical grass used to detect growth regulant activity), they showed growth retarding activity three weeks following application:

TABLE 2

| Compound | Plant Height | Fresh Weight | Dry Weight |
|---|---|---|---|
| C | 80 | 50 | 50 |
| D | 90 | 60 | 60 |

While the invention has been illustrated in the foregoing examples with reference to certain specific compounds, it comprises broadly the 1,2-maleyl-1,2,3,6-tetrahydropyridazines and the 1,2-phthaloyl-1,2,3,6-tetrahydropyridazines having, respectively, the Formulas I and II set forth above, in which formulas the symbols $R_1$ to $R_6$ stand for hydrogen or alkyl radicals, and $R_1$ and $R_6$ together can form a divalent alkylene bridge. A preferred embodiment, because of the greater accessibility of the starting materials, comprises the compounds of Formulas I and II in which the groups $R_1$ to $R_6$ are hydrogen or alkyl radicals of 1 through 10 carbon atoms, these radicals together having a total of not more than 12 carbon atoms, and $R_1$ and $R_6$, when joined together, form an alkylene bridge of 1 through 5 carbon atoms. Especially preferred are the compounds in which at most two of the R groups are alkyl radicals of 1 through 10 carbon atoms, the remaining R's being hydrogen, and the alkylene group, when present, has either 1 or 2 carbon atoms, i.e., is methylene or ethylene.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the formula

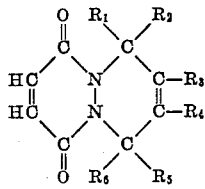

wherein $R_1$ through $R_6$ are selected from the group consisting of hydrogen and alkyl of from 1–10 carbon atoms, and $R_1$ and $R_6$ taken together can form an alkylene bridge of from 1–5 carbon atoms, all of $R_1$–$R_6$ combined having a total of up to 12 carbon atoms.

2. A compound of the formula

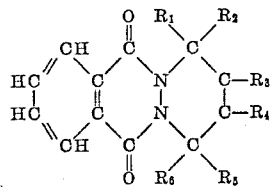

wherein $R_1$ through $R_6$ are selected from the group consisting of hydrogen and alkyl of from 1–10 carbon atoms and $R_1$ and $R_6$ taken together can form an alkylene bridge of from 1–5 carbon atoms, all of $R_1$–$R_6$ combined having a total of up to 12 carbon atoms.

3. 7,8 - dimethyl - 6,9 - dihydropyridazino[1,2-a]-pyridazine-1,4-dione.

4. 6,9 - methano - 6,9 - dihydropyridazino[1,2-a]-pyridazine-1,4-dione.

5. 6,9 - ethano-6,9-dihydropyridazino[1,2-]-pyridazine-1,4-dione.

6. 2,3 - dimethyl - 1,4 - dihydropyridazino[1,2-b]-phthalazine-6,11-dione.

7. 1,4 - dihydropyridazino[1,2-b]phthalazine-6,11-dione.

8. The process of preparing a member of the group consisting of 1,2-maleyl-1,2,3,6-tetrahydropyridazines and 1,2-phthaloyl-1,2-3,6-tetrahydropyridazines which comprises contacting in an inert liquid organic solvent at temperatures below about 0° C. a 1,3-diene hydrocarbon of the formula

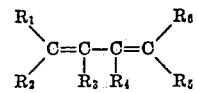

wherein $R_1$ through $R_6$ are selected from the group consisting of hydrogen and alkyl of from 1–10 carbon atoms, all of $R_1$–$R_6$ combined having a total of up to 12 carbon atoms, and $R_1$ and $R_6$ taken together can form an alkylene bridge of from 1–5 carbon atoms, with a 2,3-diazaquinone of the formula

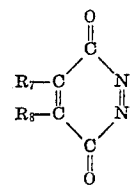

wherein $R_7$ and $R_8$ are hydrogen and when taken together $R_7$ and $R_8$ can form the divalent radical

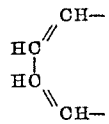

References Cited in the file of this patent
UNITED STATES PATENTS

| | | |
|---|---|---|
| 2,614,916 | Hoffman | Oct. 21, 1952 |
| 2,640,005 | Ligett et al. | May 26, 1953 |
| 2,759,938 | Du Brevil | Aug. 21, 1956 |

UNITED STATES PATENT OFFICE
CERTIFICATE OF CORRECTION

Patent No. 3,062,820                          November 6, 1962

Thomas J. Kealy

It is hereby certified that error appears in the above numbered patent requiring correction and that the said Letters Patent should read as corrected below.

Column 11, lines 17 to 26, the formula should appear as shown below instead of as in the patent:

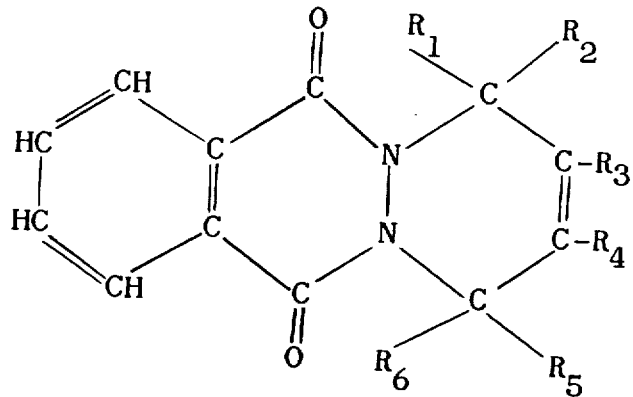

column 11, line 35, for "[1,2-]" read -- [1,2-a] --.

Signed and sealed this 11th day of June 1963.

(SEAL)
Attest:

ERNEST W. SWIDER
Attesting Officer

DAVID L. LADD
Commissioner of Patents